(12) United States Patent
Kishi

(10) Patent No.: US 7,382,351 B2
(45) Date of Patent: Jun. 3, 2008

(54) COLOR ELECTROPHORETIC DISPLAY DEVICE

(75) Inventor: Etsuro Kishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/671,213

(22) Filed: Feb. 5, 2007

(65) Prior Publication Data

US 2007/0126695 A1   Jun. 7, 2007

Related U.S. Application Data

(63) Continuation of application No. 10/794,121, filed on Mar. 4, 2004, now Pat. No. 7,227,525.

(30) Foreign Application Priority Data

Mar. 5, 2003   (JP)   .............................. 2003-058564

(51) Int. Cl.
*G09G 3/34* (2006.01)
*G02F 1/1333* (2006.01)
*G02B 26/00* (2006.01)

(52) U.S. Cl. ........................ 345/107; 349/86; 349/111; 349/139; 359/295; 359/296

(58) Field of Classification Search ................ 345/107; 349/86, 108, 111, 139, 156; 359/295, 296
See application file for complete search history.

(56) References Cited

U.S. PATENT DOCUMENTS 3,612,758 A   10/1971 Evans et al.

| | | |
|---|---|---|
| 3,668,106 A | 6/1972 | Ota |
| 5,767,826 A | 6/1998 | Sheridon et al. |
| 5,961,804 A | 10/1999 | Jacobson et al. |
| 6,113,810 A | 9/2000 | Hou et al. |
| 6,583,780 B1 | 6/2003 | Kawai |

(Continued)

FOREIGN PATENT DOCUMENTS

| JP | 49005598 | 1/1974 |
|---|---|---|
| JP | 55154198 | 12/1980 |
| JP | 57082086 | 5/1982 |
| JP | 09185087 | 7/1997 |
| JP | 11202804 | 7/1999 |
| JP | 2000035589 | 2/2000 |

*Primary Examiner*—Henry N Tran
(74) *Attorney, Agent, or Firm*—Morgan & Finnegan, L.L.P.

(57) ABSTRACT

An electrophoretic display device includes a substrate and unit cells. Each of the unit cells has one display electrode, two collection electrodes and two types of charged particles different from each other in charged polarity and coloration, and has a driving means capable of forming a state in which each of the two types of charged particles have been collected respectively at each of the collection electrodes, a state in which one of the two types of charged particles have been disposed on the display electrode and the other type of charged particles have been collected at one of the collection electrodes, a state in which one of the two types of charged particles have been collected at one of the collection electrodes and the other type of charged particles have been disposed on the display electrode, and a state intermediate between these states. A color display device is provided which promises bright and sharp-color display and has a display quality level close to that of hard-copy representation mediums.

3 Claims, 18 Drawing Sheets

U.S. PATENT DOCUMENTS

| | | |
|---|---|---|
| 6,806,995 B2 | 10/2004 | Chung et al. |
| 6,816,146 B2 | 11/2004 | Harada et al. |
| 7,038,670 B2 | 5/2006 | Liang et al. |
| 7,046,228 B2 | 5/2006 | Liang et al. |
| 7,057,600 B2 | 6/2006 | Goden |
| 7,075,502 B1 | 7/2006 | Drzaic et al. |

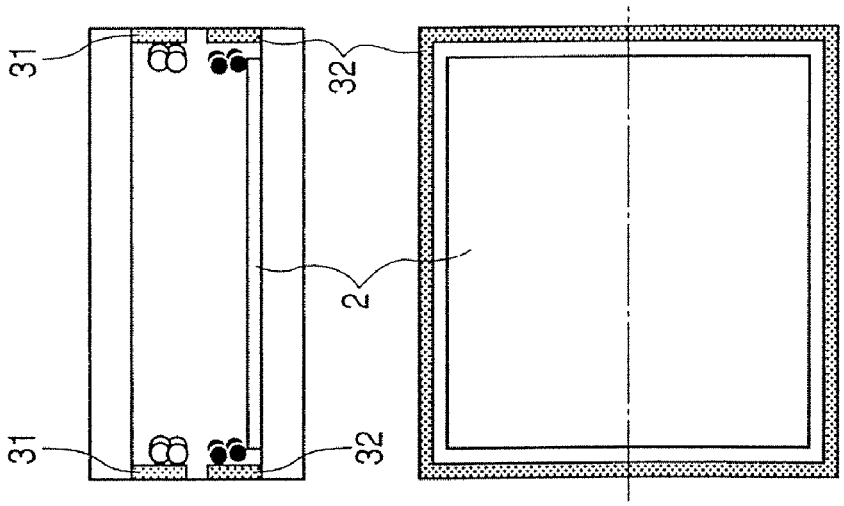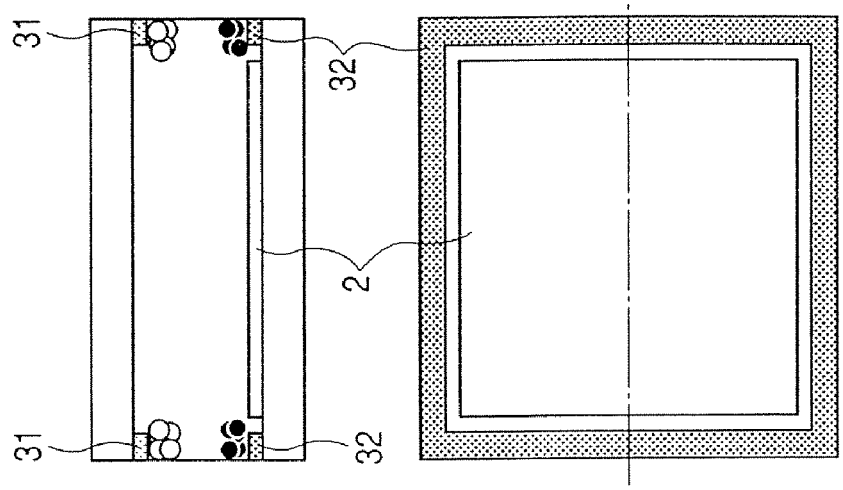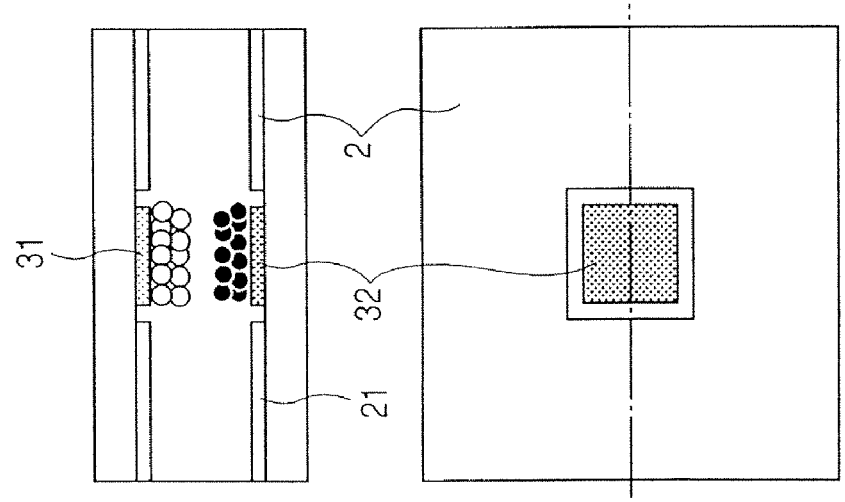

FIG. 5A
FIG. 5B
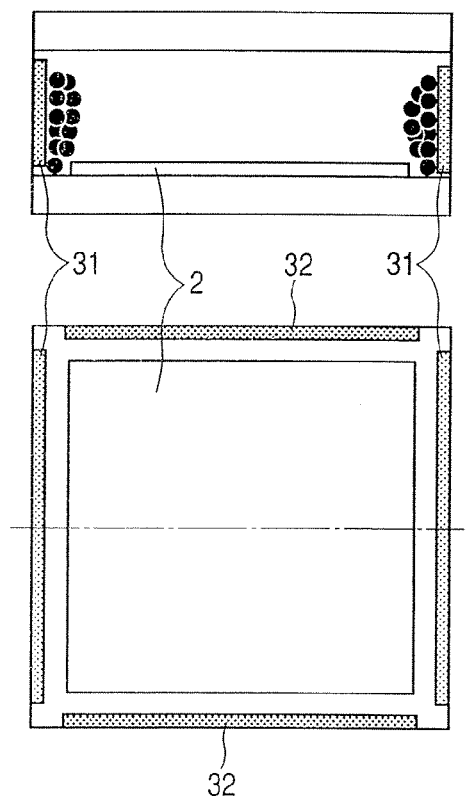
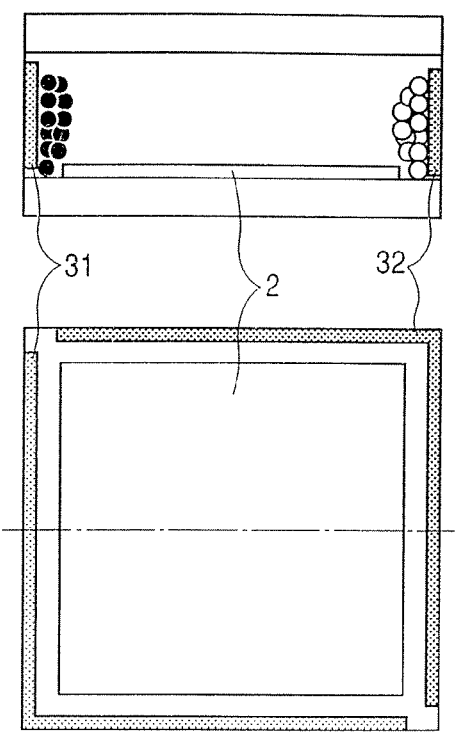

WHITE DISPLAY

MONOCHROME (G) DISPLAY

COMPLEMENTARY DISPLAY

BLACK DISPLAY

WHITE DISPLAY

MONOCHROME (G) DISPLAY

COMPLEMENTARY DISPLAY

BLACK DISPLAY

WHITE DISPLAY

MONOCHROME (G) DISPLAY

COMPLEMENTARY DISPLAY

BLACK DISPLAY

WHITE DISPLAY

MONOCHROME (G) DISPLAY

COMPLEMENTARY DISPLAY

BLACK DISPLAY

COLOR ELECTROPHORETIC DISPLAY DEVICE

RELATED APPLICATION INFORMATION

This application is a continuation of U.S. application Ser. No. 10/794,121 filed Mar. 4, 2004 now U.S. Pat. No. 7,227,525, which is incorporated herein by reference.

BACKGROUND OF THE INVENTION

1. Field of the Invention

This invention relates to a color display system in electrophoretic display devices.

2. Related Background Art

In recent years, with advancement of information machinery, the quantity of data of various information is becoming larger and larger, and the information is also outputted in various forms. The outputting of information is commonly roughly grouped into "display representation" making use of a cathode-ray tube, a liquid-crystal display panel or the like and "hard-copy representation" on paper by means of a printer or the like.

In the display representation, there is an increasing need for display devices of low power consumption and small thickness. In particular, liquid-crystal display devices have energetically been developed and commercialized as display devices adapted for such need. In liquid-crystal display devices available at present, however, characters or letters displayed on a screen may be viewed with difficulty depending on the angles at which the screen is viewed or under the influence of reflected light, and the load on the eyes which is caused by flickering, low luminance and so forth of a light source has not been properly solved. Also, in the display representation making use of a cathode-ray tube, although it provides sufficient contrast and luminance compared with the liquid-crystal display, it may cause flickering, and can not be said to have a sufficient display quality level compared with the hard-copy representation discussed below. In addition, its display units are so large and heavy as to have a very low portability.

Meanwhile, the hard-copy representation has been considered to become unnecessary as information is made electronic, but in fact hard copies are still taken in vast quantities. As reasons therefor, the following can be given. In the case of display representation of information in addition to the above problem concerning the display quality level, the display has a resolution of 120 dpi at maximum, which is fairly lower than that of prints on paper (usually 300 dpi or higher). Hence, the display representation may greatly task the eyes compared with the hard-copy representation. As a result, even though the information can be viewed on a display, it is first outputted on a hard copy. In addition, the information represented on hard copies can be arranged in a large number of sheets without any limitation of the display area as in the display representation, can be rearranged without any complicated machine operation, or can be checked in order. These are also large reasons why the hard-copy representation is used in combination even though the display representation is feasible. Furthermore, the hard-copy representation does not require any energy for retaining its representation, and has a superior portability so that the information can be checked anytime and anywhere as long as the information is not so extremely much.

Thus, as long as any motion-picture display or frequent rewriting is not required, the hard-copy representation has various advantages different from the display representation, but has such a disadvantage that paper is consumed in a large quantity. Accordingly, in recent years, development is energetically put forward on a rewritable recording medium (a recording medium on which highly visible images can repeatedly be recorded and erased in many cycles and which does not require any energy for retaining its representation). The third way of representation which has succeeded the features the hard copies have and in which images are rewritable is herein refered to as "paper-like display".

Requirements for the paper-like display are such that images are rewritable, that energy for retaining the display is not required or is sufficiently low (memory performance), that the display has a good portability, that the display has a good quality level, and so forth. At present, as a representation method which can be regarded as the paper-like display, for example, a reversible display medium is available using an organic low-molecular and high-molecular resin matrix system which is recorded and erased with a thermal printer head (e.g., Japanese Patent Applications Laid-Open No. S55-154198 and No. S57-82086). This system is partly utilized as a display area of a prepaid card, but has problems such that the contrast is not so high and the writing and erasing can only be repeated as small as 150 to 500 times.

As a way of display which is expected to be utilized as another paper-like display, an electrophoretic display device invented by Harold D. Lees et al. (U.S. Pat. No. 3,612,758) is known. Besides, Japanese Patent Application Laid-Open No. H9-185087 discloses an electrophoretic display device.

This display device is constituted of a dispersion medium having an insulating liquid in which colored charged particles stand dispersed, and a pair of electrodes which are set face to face holding this dispersion medium between them. It is a device in which, upon application of a voltage to the dispersion medium via the electrodes, the colored charged particles are attracted by Coulomb force to the electrode side having a polarity reverse to that of electric charges the particles themselves have, by utilizing electrophoretic properties of the colored charged particles. Its display is performed utilizing differences between the color of the colored charged particles and the color of an insulating liquid having been dyed. That is, the color of the colored charged particles is perceived when the colored charged particles are kept attracted to the surface of a first electrode near to the observer side and having light transmission properties. On the contrary, when the colored charged particles are kept attracted to the surface of a second electrode distant from the observer side, the color of the insulating liquid having been dyed is perceived, which has been so dyed as to have optical characteristics different from those of the colored charged particles.

However, in such an electrophoretic display device (hereinafter often refered to as "vertical-movement type electrophoretic display device"), a coloring material such as a dye or ions must be mixed in the insulating liquid, and the presence of such a coloring material tends to act as an unstable factor in electrophoretic movement because it brings about the delivering and receiving of additional electric charges, resulting in a lowering of performance, lifetime and stability as a display device in some cases.

In order to solve such a problem, an electrophoretic display device in which a pair of electrodes consisting of a first display electrode and a second display electrode are disposed on the same substrate and the charged particles are moved horizontally as viewed from the observer side, has been proposed as disclosed in Japanese Patent Applications Laid-Open No. S49-5598 and No. H10-005727. It is a device in which, utilizing electrophoretic properties of colored charged particles, display is performed by making the colored charged particles move horizontally to the substrate surface between the surface of the first display electrode and the surface of the second display electrode in a transparent insulating liquid by applying a voltage.

In such a horizontal-movement type electrophoretic display device, the insulating liquid is transparent in many cases. As viewed from the observer side, the first display electrode and the second display electrode are differently colored, and either of their colors has been made to have the same color as the colored charged particles. For example, where the color of the first display electrode is black, the color of the second display electrode is white and the color of the colored charged particles is black, the second display electrode comes uncovered to see white when the colored charged particles stand distributed over the first display electrode, and see black as the color of the colored charged particles when the colored charged particles stand distributed over the second display electrode.

Now, the most fundamental system for materializing color display in the above electrophoretic display devices is a system in which three unit cells respectively having the three primary colors consisting of RGB or YMC are disposed in parallel on the same plane to make up each pixel and the color display is performed by the principle of additive color mixing. In either system of the vertical-movement type and the horizontal-movement type, each unit cell has one type of colored charged particles, two drive electrodes and a colored migration liquid, where two colors, the color of the colored charged particles and the color of the colored migration liquid, or the color of the colored charged particles and the color of a color filter, can be shown by the movement of the particles.

For example, in Japanese Patent Applications Laid-Open No. 2000-035589, three unit cells having different colored liquids with the three primary colors are disposed in parallel to form each pixel. Unit cells formed of microcapsules in which a colored liquid and white particles have been enclosed are ejected from nozzles so that microcapsules having different colored liquids (migration liquids) with the three primary colors, yellow (Y), cyan (C) and magenta (M) are regularly arranged. Each microcapsule changes alternately in two colors, the white which is the color of the particles and the color of the migration liquid, by the vertical movement of the white particles.

Also in the case of the horizontal-movement type, three unit cells showing different colors for color display are arranged to make up each pixel. Each unit cell is filled with a transparent insulating liquid and black particles. On the display electrode surfaces of the unit cells, different color filters with the three primary colors, red (R), green (G) and blue (B), are respectively disposed in order from the left cell. Each unit cell changes alternately in two colors, the black which is the color of the particles and the color of each color filter, by the horizontal movement of the black particles.

In any of the above systems, when color display is performed, each pixel is formed by the three unit cells disposed adjoiningly and having colors corresponding to the three primary colors, and the desired display color is formed by the principle of additive color mixing.

However, in the additive color mixing of the three primary colors, it is theoretically impossible to achieve brightness and color sharpness (inclusive of sufficient black display) simultaneously, and it is very difficult to materialize a reflection type display device having the display quality level the printed mediums can have. In the case of the additive color mixing by the use of white particles plus the three primary colors Y, C and M, a satisfactory level can be achieved in respect of the brightness, but colors of pastel shades lacking in color sharpness are shown because the white light component is always superimposed on the background of reflected light, and also any sufficient black is not obtainable. A sufficient black is obtainable if black particles are used, but such a measure is insufficient in respect of the brightness and the color sharpness. On the other hand, in the case of the additive color mixing by the use of black particles plus the three primary colors R, G and B, the intensity ratio of reflected light to incident light is ⅑ or less in the monochrome display and ⅓ or less in the white display, where any sufficient brightness is not achieved. The brightness is improved if white particles are used, but any sharp color representation is not obtainable and also any sufficient black is not obtainable.

In WO 99/53373, in order to improve brightness and sharpness of colors in the additive color mixing, a structure is disclosed in which unit cell microcapsules change in three colors. Three unit cells showing different colors for color display are arranged to make up each pixel. In this structure, which is called "dual particle curtain mode", the microcapsules are filled with an migration liquid in which two types of colored charged particles having different charge polarities and colors have been dispersed. By applying voltage to three drive electrodes disposed in the unit cells, the two types of colored charged particles are moved independently, where each unit cell can be changed alternately in three colors, the three colors of the two types of colored charged particles and the color of the migration liquid, or the three colors of the two types of colored charged particles and the color of each color filter disposed on the back of the microcapsules. A typical cell structure disclosed in this WO 99/53373 is shown in FIGS. 17 to 18D. A display electrode is disposed on the side of a front substrate, and two collection electrodes to which different voltages can be applied are disposed on the side of a back substrate. Its insulating liquid is transparent, and a color filter is disposed on the back of each unit cell. For example, in the case of a combination of white charged particles with the electrophretic particles and a color filter standing in a complementary color relation to the charged particles, the sharpness and brightness of colors can be improved in respect of monochrome display (FIG. 18B) and complementary-color display (FIG. 18C).

In the structure shown in FIGS. 17 to 18D, however, the collection electrodes are both formed on the back substrate side, and hence, the open-area ratio, which is of the area in which the color filter disposed on the back of each unit cell functions effectively (the display area shown in FIG. 17), is remarkably reduced inevitably. As a result, there is a problem in that the sharpness and brightness of colors that are originally to be aimed at are insufficient.

Use of not the color filter but the colored insulating liquid enables avoidance of the above problem to a certain extent. In such a case, however, there is a problem in that a coloring dye added to the insulating liquid tends to cause deterioration in extensive operation due to electrode reaction and contrast deterioration due to the dyeing of charged particles.

There also is a problem in that since the number of electrodes become larger by one from the conventional two electrodes to the three electrodes, this consequently makes it necessary to narrow wiring pitches at a display medium panel portion or causes a rise in drive IC costs.

SUMMARY OF THE INVENTION

Taking into account the problems discussed above, an object of the present invention is to provide a color electrophoretic display device, in particular, a reflection type color electrophoretic display device, having been improved in brightness and color sharpness and having achieved a display quality level closer to that of hard-copy representation mediums.

The object of the present invention can be achieved by the following means.

That is, the present invention provides an electrophoretic display device comprising unit cells each of which has one display electrode, two collection electrodes and two types of charged particles which are different from each other in charge polarity and coloration, and has a driving means capable of forming a state in which each of the two types of parged particles have been collected at each of the collection electrodes, a state in which one of the two types of charged particles have been disposed on the display electrode and the other type of charged particles has been collected at one of the collection electrodes, a state in which one of the two types of charged particles have been collected at one of the collection electrodes and the other type of charged particles have been disposed on the display electrode, and a state intermediate between these states.

As an invention to remedy the loss of open-area ratio due to the two collection electrodes, there is proposed the constitution in which the two collection electrodes are disposed at a position where they lie substantially one upon another as viewed from the observer side.

Stated more specifically, proposed are:

the constitution in which a partition wall is provided which divides adjoining unit cells, and the two collection electrodes are disposed on both ends of the partition wall or in the interior of the partition wall; or the constitution in which at least one of the two collection electrodes is disposed in a recessed structure such as a hole or a groove in which the charged particles are holdable; and the constitution in which the unit cell has a partition wall which divides adjoining unit cells, and at least one of the two collection electrodes is disposed at the bottom of a groove formed adjoiningly to the partition wall and around the unit cell.

As another invention to remedy the loss of open-area ratio, there is proposed the constitution in which the unit cell has a partition wall which divides adjoining unit cells, and at least one of the two collection electrodes is disposed on the surface of, or in the interior of, the partition wall.

As specific constitution of a color electrophoretic display device, proposed is:

the constitution in which pixels in each of which three unit cells are adjoiningly disposed in parallel are arranged in matrix form, the two types of charged particles contained in the three unit cells are all black particles and white particles, and color filters with the three primary colors red, green and blue, or cyan, magenta and yellow, are respectively disposed on the back sides of the three unit cells; or the constitution in which pixels in each of which three unit cells are adjoiningly disposed in parallel are arranged in a matrix, the colors of the two types of charged particles in the three unit cells are in combination of red and green, green and blue, and blue and red, respectively, and white scattering layers are disposed on all the back sides of the three unit cells; or the constitution in which pixels in each of which three unit cells are adjoiningly disposed in parallel are arranged in a matrix, the colors of the two types of charged particles in the three unit cells are in combination of red and cyan, green and magenta, and blue and yellow, respectively, and white scattering layers are disposed on all the back sides of the three unit cells; or the constitution in which pixels in each of which three unit cells are adjoiningly disposed in parallel are arranged in a matrix, the color of one of the two types of charged particles contained in the three unit cells is white, color filters are disposed on the back sides of the three unit cells, and the color of the other charged particles contained in the three unit cells and the colors of the color filters disposed on the back sides are in combination of red and cyan, green and magenta, and blue and yellow, respectively; or in the right above constitution, the constitution in which at least one of the two types of charged particles is light-transmissive colored particles, and display colors are formed by the principle of subtractive color mixing when the light-transmissive colored particles are arranged on the color filters.

The constitution is also proposed in which the unit cell contains a microcapsule enclosing an migration liquid in which the two types of charged particles stand dispersed.

As an invention to make it unnecessary to narrow wiring pitches at a display medium panel portion, or reduce a rise in drive IC costs, proposed are:

in an electrophoretic display device in which pixels comprising unit cells are arranged in matrix foprm, the constitution in which the two collection electrodes in each unit cell are common electrodes to each other to which a voltage common to all the pixels is to be applied; and a method for driving an electrophoretic display device in which pixels comprising unit cells are arranged in matrix form; the method comprising:

a first step of applying a drive pulse common to all the pixels to each of one display electrode and two collection electrodes in each unit cell to collect charged particles to the collection electrodes; and a second step of applying a drive pulse common to all the pixels to each of the two collection electrodes, and applying a desired different drive pulse corresponding to image information for each pixel, to the display electrode to perform writing.

As summarized above, in the present invention, in the electrophoretic display device having one display electrode, two collection electrodes and two types of charged particles showing charge polarity and color development which are different from each other, the two collection electrodes are disposed at a position where they lie substantially one upon another as viewed from the observer side, or disposed at the sides of partition walls. Such constitution can vastly remedy the loss of display area open-area ratio that is due to the introduction of the two collection electrodes.

A driving method is also proposed which makes it possible to set the two collection electrodes as common electrodes by a novel drive sequence, thereby avoiding the restriction on electrode pitches and the rise in drive IC costs that are due to signal lines formed in a larger number.

BRIEF DESCRIPTION OF THE DRAWINGS

FIGS. 2A, 2B and 2C are sectional and plan views showing variations of the structure of the unit cell.

FIGS. 5A and 5B are sectional and plan views showing variations of the structure of the unit cell.

DETAILED DESCRIPTION OF THE PREFERRED EMBODIMENTS

The present invention is described below in greater detail with reference to the accompanying drawings.

(Basic Structure of Unit Cell)

Figure 1A:
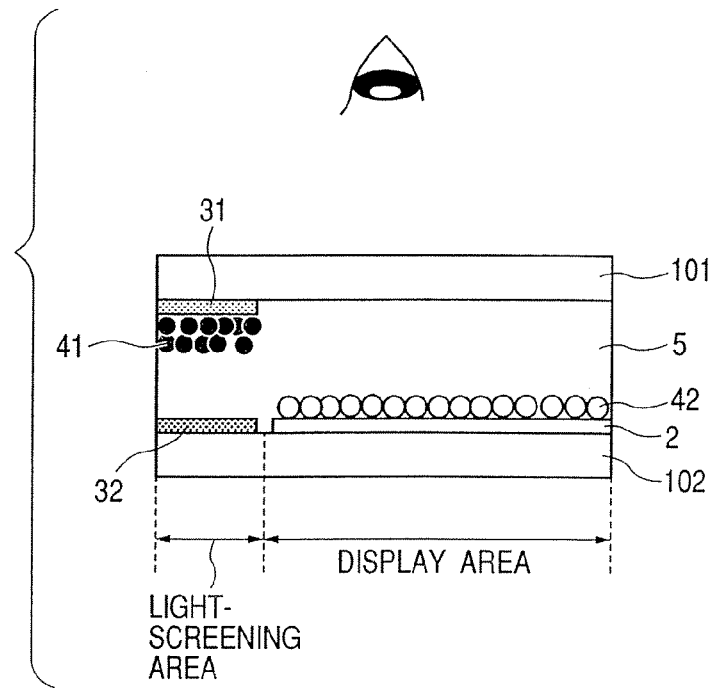
FIGS. 1A and 1B are sectional views showing the concept of a unit cell.
Figure 1B:
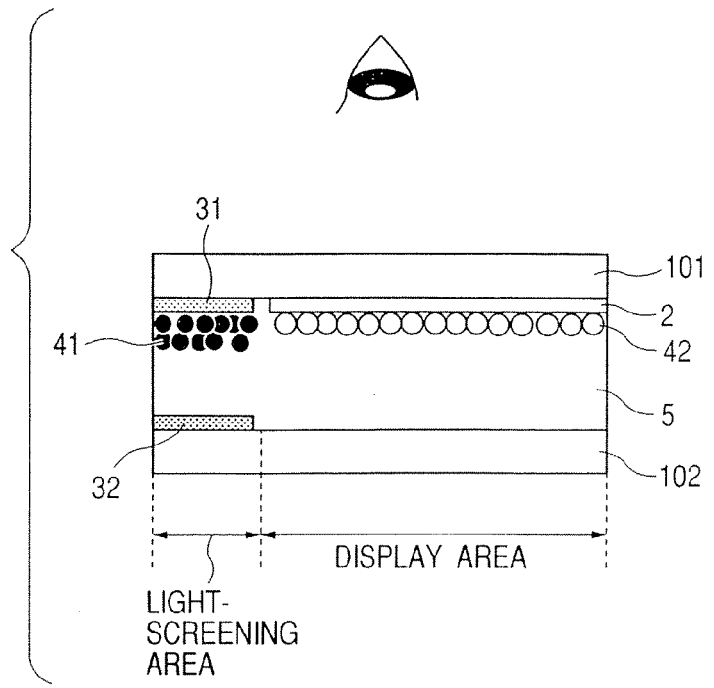

FIGS. 1A and 1B are schematic views showing an example of the sectional structure of a unit cell which is a basic component of the present invention. The space between a back substrate 102 and an observation side substrate 101 which are disposed face to face leaving a constant space between them is filled with a transparent insulating migration liquid 5. In this liquid, two types of charged particles 41 and 42 different in charge polarity and coloration are dispersed. A display electrode 2 is disposed either on the observation side substrate (FIG. 1A) or on the back substrate (FIG. 1B) to form a display area. The display electrode 2 is transparent in the visible light region at least where it is disposed on the observation side substrate.

Two collection electrodes are disposed in the unit cell. One of characteristic features of the present invention in regard to the disposition of collection electrodes is such that a first collection electrode 31 and a second collection electrode 32 are face to face disposed on the observation side substrate 101 and the back substrate 102, respectively, at a position where they lie substantially one upon another as viewed from the observer side. In order to prevent colors from mixing, the areas where the collection electrodes are disposed may preferably be light-screened in black. A black electrode material may also be used, or a black insulating layer may additionally be provided. The loss of open-area ratio of the display area due to the collection electrodes can be halved compared with the case in which two collection electrodes are disposed only on either of the back substrate and the observation side substrate.

The position of the two types of collection electrodes is by no means limited to the disposition shown in FIGS. 1A and 1B. The following cases may be conceived: a case in which the collection electrodes 31 and 32 are disposed at the middle of the observation side substrate and at the middle of the unit cell back substrate, respectively (FIG. 2A); a case in which the collection electrodes 31 and 32 are disposed at the periphery of the observation side substrate and at the periphery of the unit cell back substrate, respectively (FIG. 2B); and a case in which the collection electrodes 31 and 32 are disposed on unit cell partition wall surfaces on the side of the observation side substrate and on the side of the unit cell back substrate, respectively (FIG. 2C).

Figure 3A:
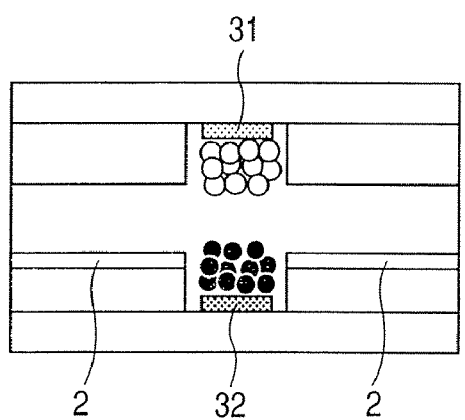
FIGS. 3A and 3B are sectional views showing variations of the structure of the unit cell.
Figure 3B:
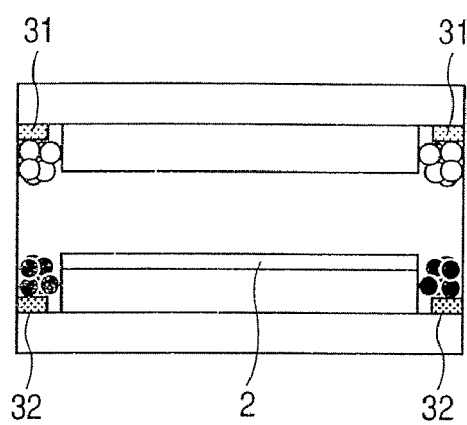

The collection electrodes may be disposed at the bottoms of recessed portions as shown in FIGS. 3A and 3B. In this case, there is such an advantage that the charged particles that can be held on the collection electrodes in a larger number to enhance the open-area ratio. In the case shown in FIG. 3A, the two collection electrodes 31 and 32 are disposed at the bottoms of square hollows made in the observation side substrate and in the back substrate, respectively, at their middle portions. In the case shown in FIG. 3B, the two collection electrodes 31 and 32 are disposed at the bottoms of grooves made in the observation side substrate and in the back substrate, respectively, at their peripheral portions.

Figure 4:
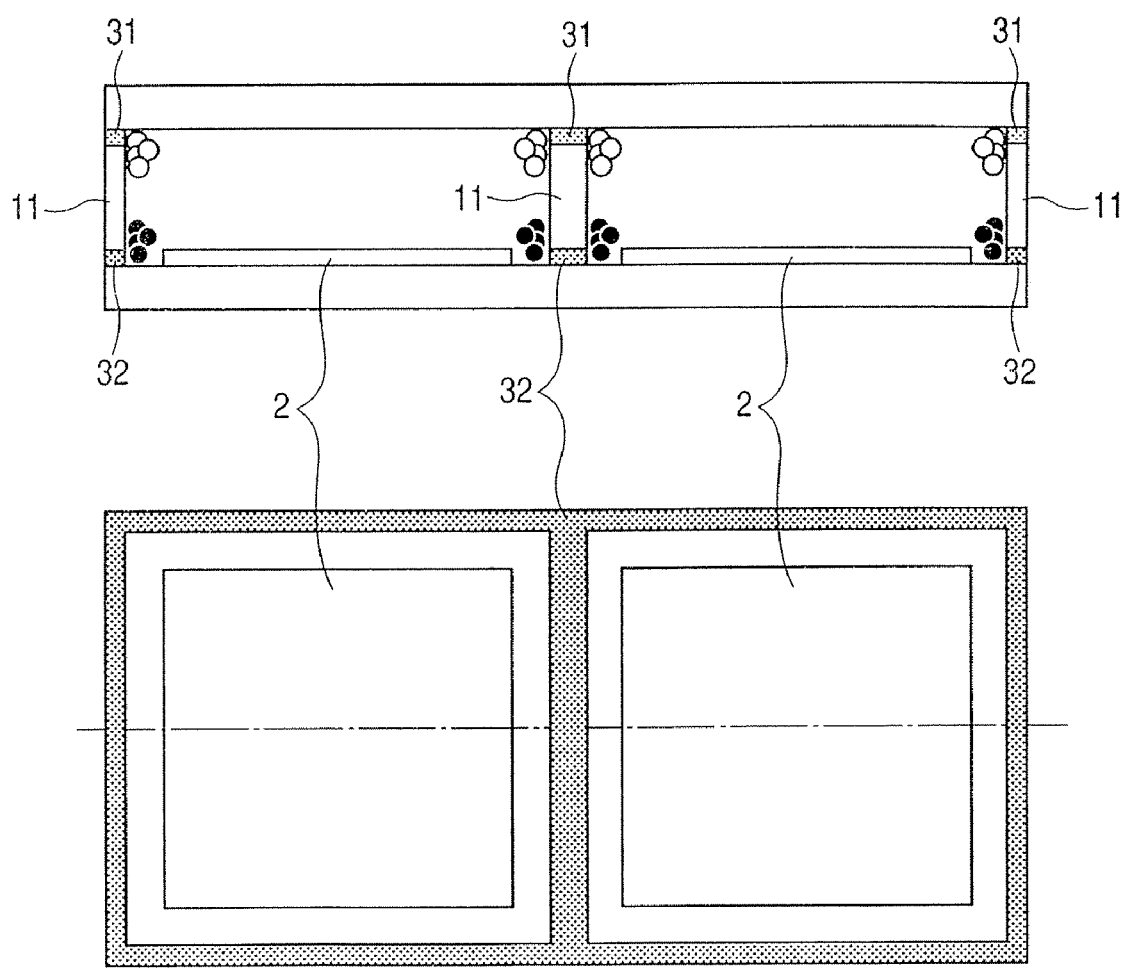
FIG. 4 is a sectional view and a plan view showing a variation of the structure of the unit cell.

The collection electrodes may be disposed at the positions of partition walls which divide unit cells, i.e., at the tops and bottoms of each partition wall or in the interiors of the partition walls. In such a case, the collection electrodes disappear from the sight inside the pixels, and hence the open-area ratio can be expected to be vastly enhanced. In the structure shown in FIG. 4, the two collection electrodes 31 and 32 are disposed at the tops and bottoms, respectively, of partition walls 11.

One of other characteristic features in regard to the disposition of collection electrodes in the present invention is in that the collection electrodes are disposed at the sides of partition walls (see FIGS. 5A, 5B and FIG. 2C). This includes a structure in which the collection electrodes are embedded in the interior of partition walls or the partition walls themselves serve as the collection electrodes. This is more advantageous in respect of the open-area ratio of display areas than a case in which the two collection, electrodes are disposed only on either of the back substrate and the observation side substrate.

Figure 6A:
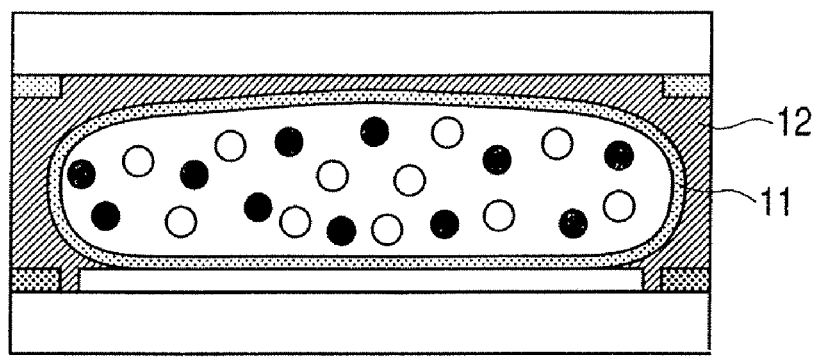
FIGS. 6A, 6B and 6C are sectional views showing variations of the structure of the unit cell.
Figure 6B:
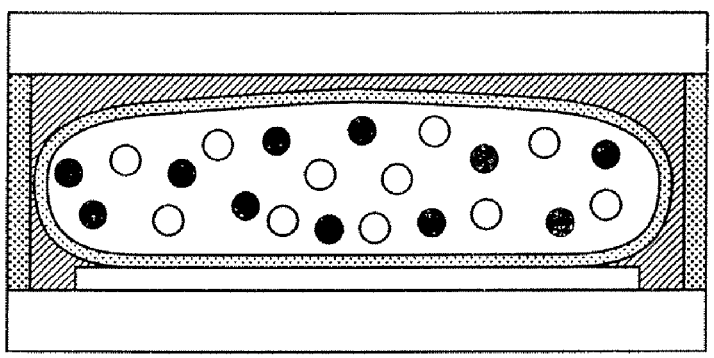
Figure 6C:
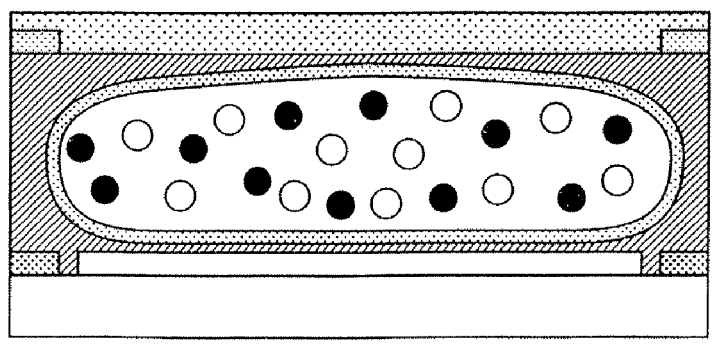

Encapsulization (enclosure in microcapsules) of the charged particles in unit cells is also one of preferred embodiments. As shown in FIGS. 6A to 6C, each transparent microcapsule 11 having enclosed two types of particles and an migration liquid is disposed in the state it has been made flat. FIG. 6A shows an example in which, between substrates having the electrode structure shown in FIG. 2B, the air space between both electrodes and the microcapsule 11 is filled with a transparent resin binder 12, in the state of which the microcapsule is pressed with both the substrates to make it flat, followed by curing of the resin binder 12 to fix the microcapsule in a flat shape. As the resin binder, it is preferable to use an ultraviolet-curable resin or a heat-curable resin. FIG. 6B shows an example in which the microcapsule is fixed in the same manner but between substrates having the electrode structure shown in FIG. 5A. FIG. 6C shows an example in which the observation side substrate has been omitted in the electrode structure shown in FIG. 2B. The top surface of the resin binder with which the microcapsule is fixed may be made flat and the electrode and an insulating layer may directly be formed on the flatted surface, provided that the electrode is formed by a low-temperature process which does not require any vacuum treatment, such as the printing of organic conductive films.

In the foregoing structures, the number of the first collection electrode 31 and second collection electrode 32 are by no means limited to one for each. A plurality of electrodes may be provided on the back substrate and/or the observation side substrate 101.

There are no particular limitations on the plane shape of pixels, which may include any shapes as exemplified by polygons such as squares, rectangles and hexagons, and circles.

(How to Drive Unit Cell)

A basic method of driving the unit cells in the present invention is described with reference to FIGS. 7A to 7F. In the present invention, the driving method is characterized in that display in three states and display intermediate between these states are performed by forming a first state in which the two types of charged particles are both attracted to the two collection electrodes (FIG. 7B), a second state in which only first particles of the two types of charged particles are attracted to the display electrode (FIG. 7C), a third state in which only second charged particles are attracted to the display electrode (FIG. 7D), and a state intermediate between these three states.

The respective charged particles are polymer particles colored in desired colors. In these drawings, the first charged particles of the two types of charged particles are assumed to be negatively charged and the second charged particles to be positively charged.

Figure 7A:
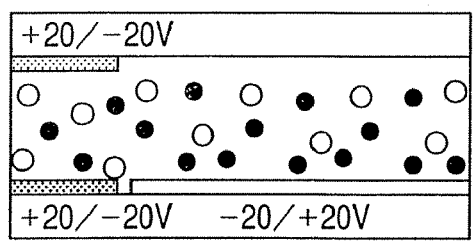
FIGS. 7A, 7B, 7C, 7D, 7E and 7F illustrate a method of driving the unit cell.

Before the display is performed, it is reset to a initial state (FIG. 7A). A continuous rectangular wave voltage of 10 Hz and +20 and −20 V is applied to the first collection electrode and the second collection electrode and another continuous rectangular wave voltage of reversed phaseis applied to the display electrode. Thus, an initial state is formed in which the two types of charged particles stand dispersed uniformly in the cell.

To form the first state (FIG. 7B), the display is first reset to the initial state, and then, keeping the display electrode at 0 V, a rectangular pulse of +20 V and 100 ms is applied to the first collection electrode, and a rectangular pulse of −20 V and 100 ms to the second collection electrode. Most of the first negatively charged paticles collect to the first collection electrode, and on the other hand most of the second positively charged particles collect to the second collection electrode, so that the transparent display electrode surface is exposed to the observer side.

To form the second state (FIG. 7C), after the display has been reset to the initial state, a rectangular pulse of +20 V and 100 ms is applied to the display electrode, and a rectangular pulse of −20 V and 100 ms to the second collection electrode while keeping the first collection electrode at 0 V. Most of the second positively charged particles collect to the second collection electrode disposed at the light-screening area, and on the other hand the first negatively charged particles form a particle layer on the display electrode which affords a display area.

To form the third state (FIG. 7D), after the display has been reset to be initialized, keeping the second collection electrode at 0 V, a rectangular pulse of −20 V and 100 ms is applied to the display electrode, and a rectangular pulse of +20 V and 100 ms to the first collection electrode. The first negatively charged particles collect to the first collection electrode disposed at the light-screening area, and on the other hand the second positively charged particles form a particle layer on the display electrode which affords a display area.

Figure 7B:
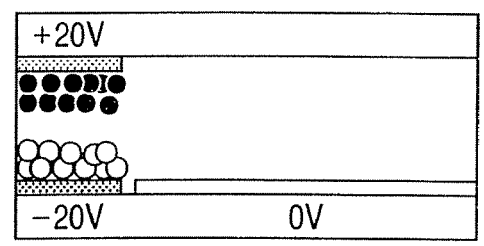
Figure 7C:
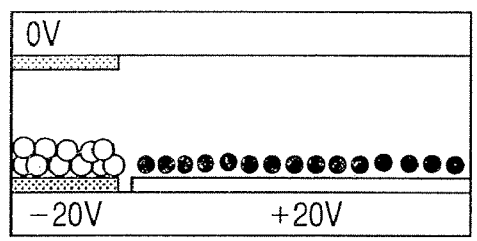
Figure 7D:
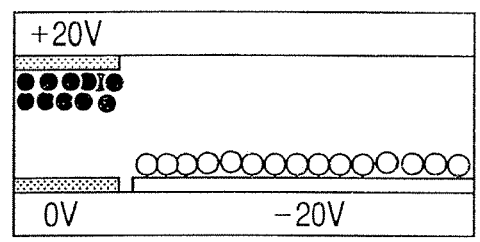
Figure 7E:
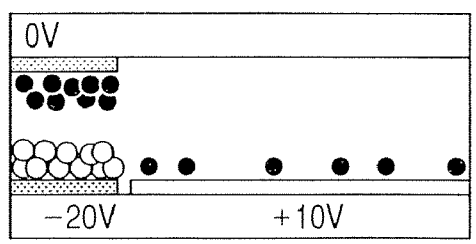
Figure 7F:
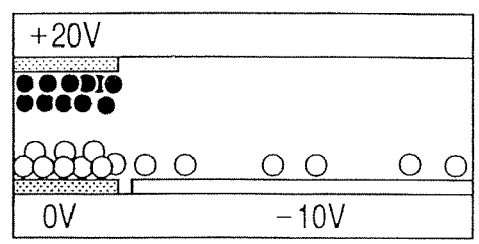
Figure 8A:
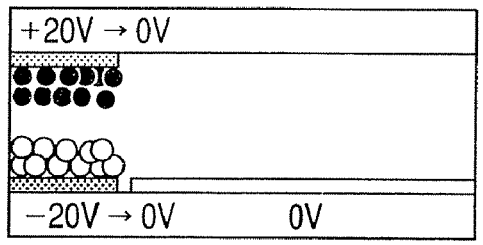
FIGS. 8A, 8B, 8C, 8D, 8E and 8F illustrate another method of driving the unit cell.
Figure 8B:
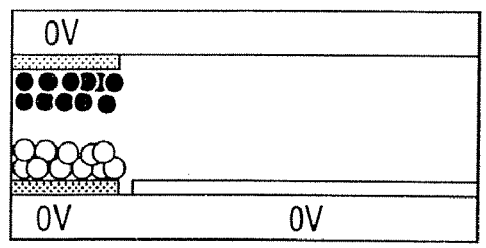
Figure 8C:
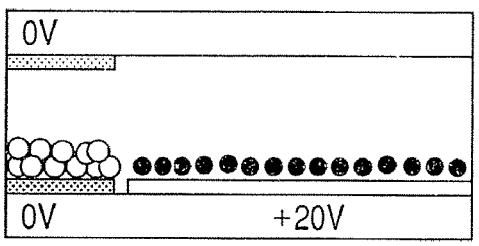
Figure 8D:
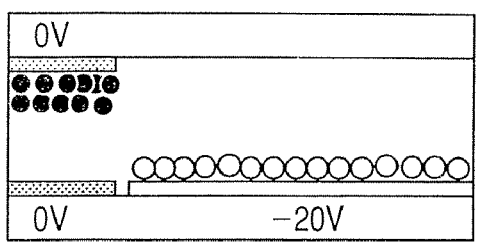
Figure 8E:
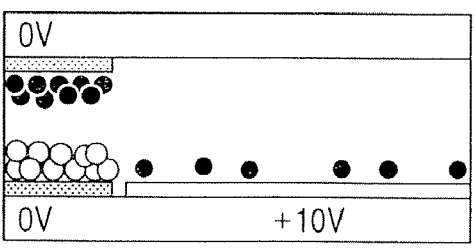
Figure 8F:
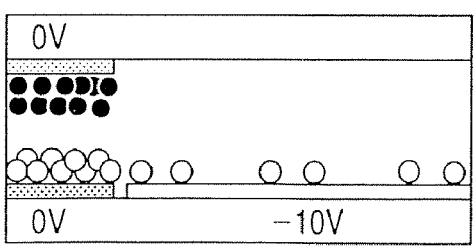

The state intermediate between these first to fourth states can also be formed (FIGS. 7E and 7F). For example, in the case when an intermediate state shown in FIG. 7E is to be formed, after the display has been reset to the initial state, a rectangular pulse of +10 V and 100 ms is applied to the first display electrode, and a rectangular pulse of +20 V and 100 ms to the second collection electrode while keeping the first collection electrode at 0 V. Some of the first charged particles collect on the first collection electrode, and the remaining first charged particles come dispersed on the display electrode. On the other hand, the second charged particles collect on the second collection electrode.

The initial reset state is not necessarily limited to the particle-dispersed state. For example, the first state (FIG. 6B) may be set as the initial reset state. It is a matter of course that the conditions for voltage application to each state change depending on the reset state.

In the foregoing description, in order to simply describe the basic driving method, the voltages applied to the display electrode and two collection electrodes at the time of writing are so changed as to be 0V, +20V and −20 V for each display state as shown in FIGS. 7B to 7D. However, where unit cells are actually arranged in a matrix form and driven, signal lines must be provided in a larger number than in conventional systems to cause the restriction on electrode pitches and the rise in drive IC costs.

Accordingly, in the present invention, in order to reduce the number of electrodes which must be controlled independently for each pixel, a driving method is proposed in which the two of the three electrodes can be set to be common electrodes to which the same voltage may be applied in all pixels. Such a driving method characteristic of the present invention is described with reference to FIGS. 8A to 8F.

In FIGS. 8A to 8F, the first collection electrode and second collection electrode are set to be common electrodes. First, the display is brought to the initial reset state to form a first state (FIG. 8A), and then all the electrodes are set to 0 V. In the writing, in the state the common electrodes, two collection electrodes, are fixed to 0V, a desired voltage is applied only to the display electrode, whereby a first state to a third state (FIGS. 8B to 8E) and an intermediate state of these (FIG. 8F) can be formed.

(Pixel Structure and Display Method for Color Display)

Figure 9:
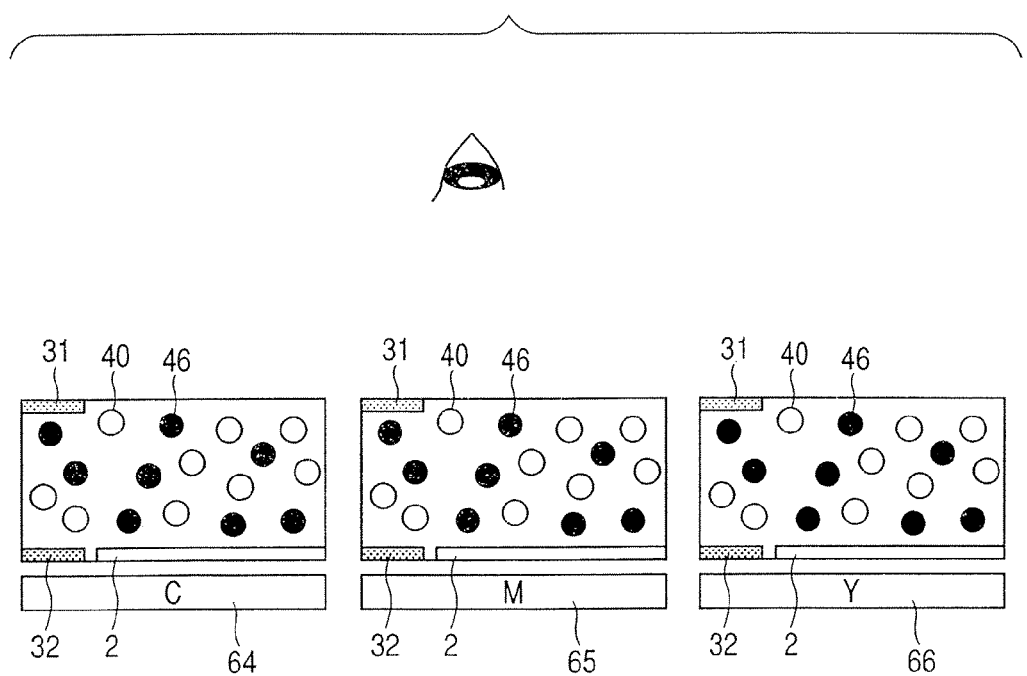
FIG. 9 is a sectional view of a pixel structure of a parallel-disposition type in its first example.

A typical pixel structure in the present invention and its color display method are described with reference to FIG. 9 and FIGS. 10A to 10D. FIG. 9 shows a schematic cross-section of the pixel structure. The unit cell according to the present invention, having been described with reference to FIG. 1, is used in three which are disposed in parallel to make up each pixel. In the following, these are refered to as a first cell, a second cell and a third cell in order from the left-side cell. A first collection electrode 31 and a second collection electrode 32 are disposed on the side of the observation side substrate on the side of the back substrate side, respectively, in each cell. The first display electrode 21 and second display electrode 22 are disposed at a position where they lie substantially one upon another as viewed from the observer side.

In what is shown in this drawing, the first cell to third cell are all filled with insulating liquids in which black positively charged particles 47 and white negatively charged particles 48 respectively stand dispersed. Three-primary-color scattering layers of red, green and blue or cyan, magenta and yellow are respectively disposed on the backs of the respective cells. In what is shown in this drawing, a cyan scattering layer 64 is disposed on the back of the first cell, a magenta scattering layer 65 on the back of the second cell, and a yellow scattering layer 66 on the back of the third cell. In this embodiment, the brightness and sharpness of color display are not improved, but there is such an advantage that the brightness of white display and the light-screening performance of black display are vastly improved.

A color display method in the pixel structure shown in FIG. 9 is described below with reference to FIGS. 10A to 10D, regarding respective cases of white display, monochrome display, complementary-color display and black display.

Figure 10A:
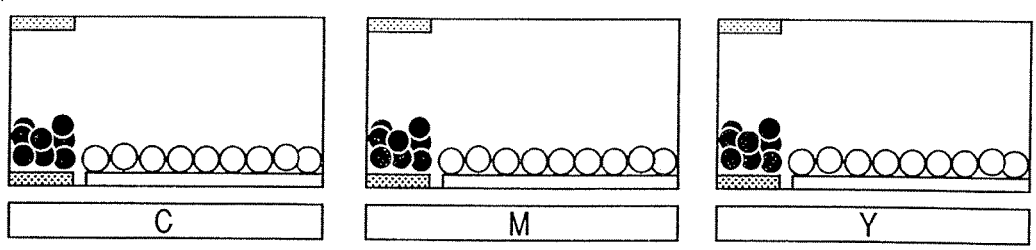
FIGS. 10A, 10B, 10C and 10D illustrate a color display method in the first example of the pixel structure of a parallel-disposition type.

In the case of white display, as shown in FIG. 10A, in all cells, white particles are arranged on all the display electrodes and black particles are collected at the second collection electrodes. White incident light is scattered at white particle layers, and white light is emitted without being modulated.

Figure 10B:
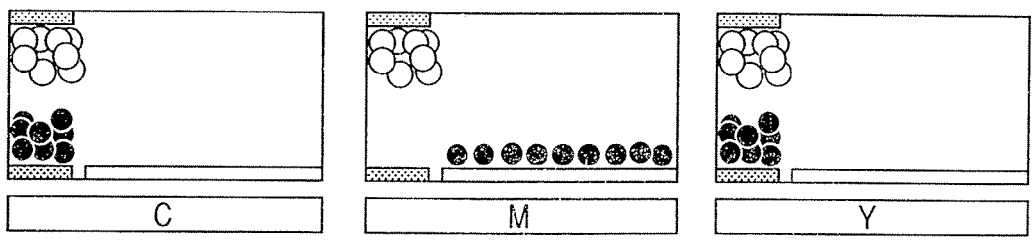

As an example of monochrome display such as red display, green display or blue display, a case of green display is shown in FIG. 10B. In the first cell and third cell, white particles and black particles are collected at the first collection electrodes and second collection electrodes, respectively, to make the cyan scattering layer and the yellow scattering layer uncovered. Also, in the second cell, white particles are collected at the first collection electrode, and a black particle layer is formed on the display electrode to hide the magenta scattering layer. White incident light is modulated to green light by the additive color mixing between the cyan light component scattered in the first cell and the yellow light component scattered in the third cell, and the green light is emitted.

Figure 10C:
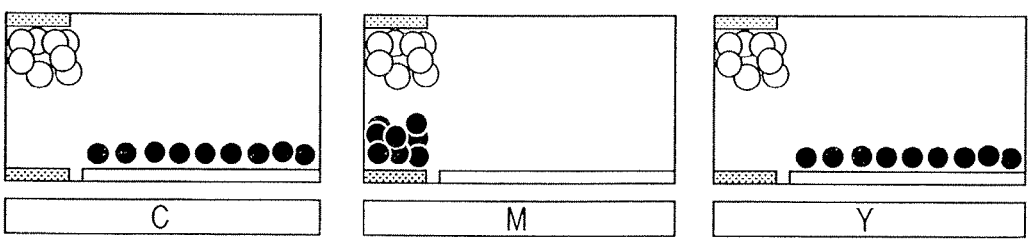

As an example of complementary-color display such as cyan display, magenta display or yellow display, a case of magenta display is shown in FIG. 10C. In the first cell and third cell, white particles are collected at the first collection electrodes, and black particle layers are formed on the display electrodes to hide the cyan scattering layer and the yellow scattering layer. Also, in the second cell, white particles and black particles are collected at the first collection electrode and second collection electrode, respectively, to make the magenta scattering layer uncovered. White incident light is modulated to magenta light scattered in the second cell, and the magenta light is emitted.

Figure 10D:
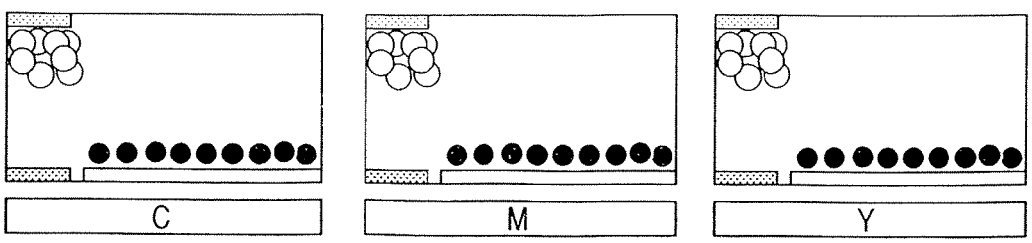

In the case of black display, as shown in FIG. 10D, white particles are collected at the first collection electrodes in all cells, and black particle layers are formed on the display electrodes to hide the color scattering layers. White incident light is all absorbed at the black particle layers.

Figure 11:
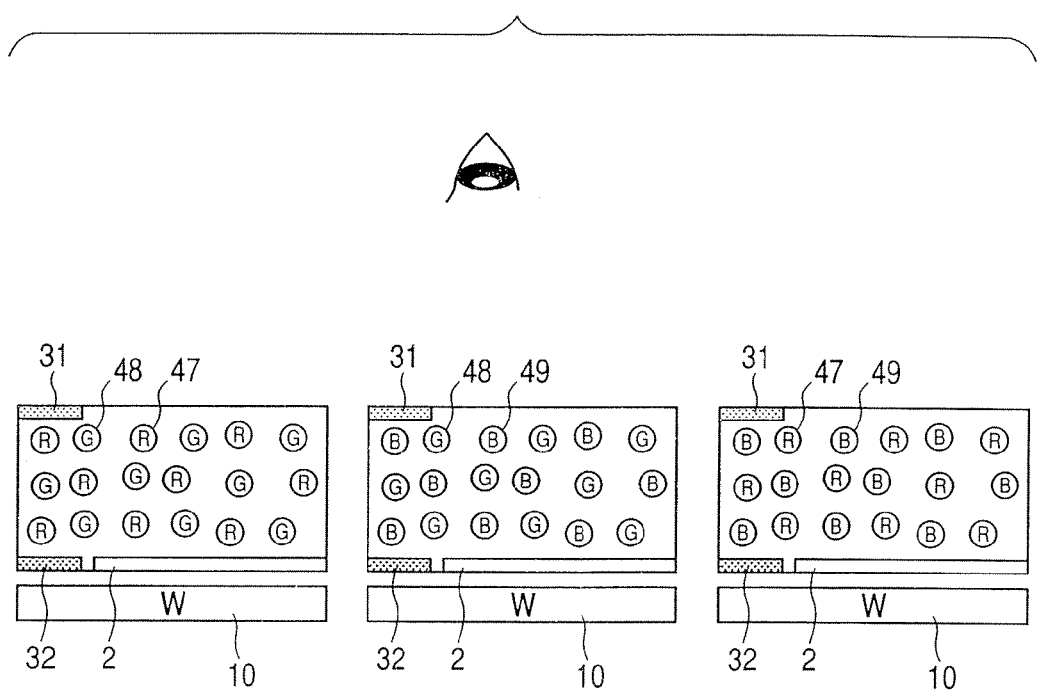
FIG. 11 is a sectional view of the pixel structure of a parallel-disposition type in its second example.

Next, another typical pixel structure in the present invention and its color display method are described with reference to FIG. 11 and FIGS. 12A to 12D. FIG. 11 shows a schematic cross-section of the pixel structure. Description concerning the same constituents as shown in FIG. 9 is omitted. In this embodiment, different color charged particles are disposed in cells in different combination for each cell. As the combination of the colors of charged particles, it may include combinations of red particles and cyan particles, green particles and magenta particles, and blue particles and yellow particles; combinations of red particles and green particles, green particles and blue particles, and blue particles and red particles; and combinations of cyan particles and magenta particles, magenta particles and yellow particles, and yellow particles and cyan particles.

In FIG. 11, the first cell, second cell and third cell are filled with insulating liquids in which red particles 47 and green particles 48, green particles 48 and blue particles 49, and blue particles 49 and red particles 47, respectively, stand dispersed. White scattering layers 10 are respectively disposed on the backs of the respective cells. In this embodiment, black display can not be expected to be improved, but there is such an advantage that the brightness of white display and the brightness and sharpness of color display are vastly improved.

A color display method in the pixel structure shown in FIG. 11 is described below with reference to FIGS. 12A to 12D, regarding respective cases of white display, monochrome display, complementary-color display and black display.

Figure 12A:
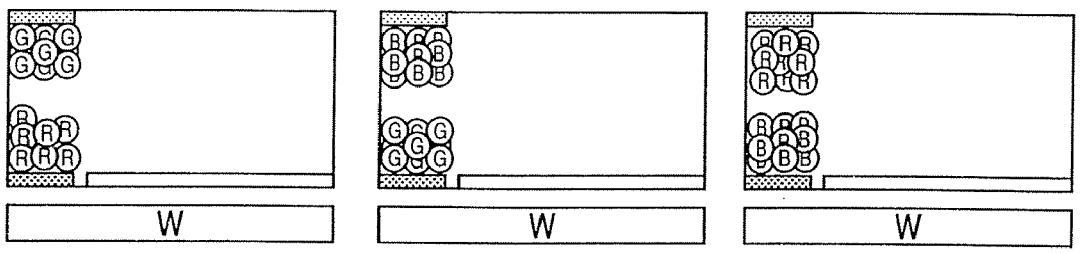
FIGS. 12A, 12B, 12C and 12D illustrate a color display method in the second example of the pixel structure of a parallel-disposition type.

In the case of white display, as shown in FIG. 12A, in all cells, two types of color particles are collected at the first collection electrodes and second collection electrodes to make the white scattering layers uncovered. White incident light is scattered at white particle layers, and is emitted without being modulated.

Figure 12B:
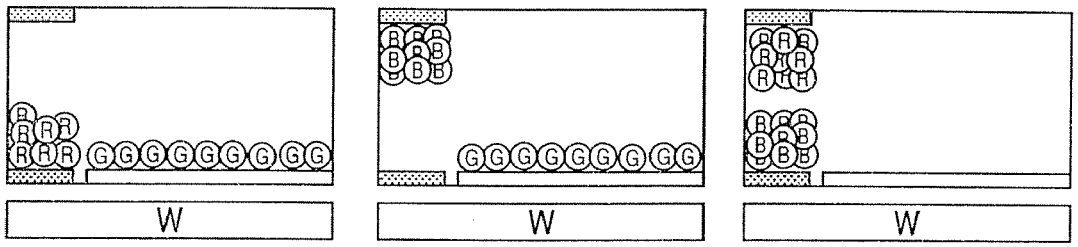

As an example of monochrome display such as red display, green display or blue display, a case of green display is shown in FIG. 12B. In the first cell, red particles are collected at the second collection electrode, and meanwhile a green particle layer is formed on the display electrode. In the second cell, blue particles are collected at the first collection electrode, and on the other hand, a green particle layer is formed on the display electrode. Also, in the third cell, blue particles and red particles are collected at the second collection electrode and first collection electrode, respectively, to make the white scattering layer uncovered. White incident light is modulated to green light by the additive color mixing between the green light component scattered in the first cell and second cell and the white light component scattered in the third cell, and is emitted.

Figure 12C:
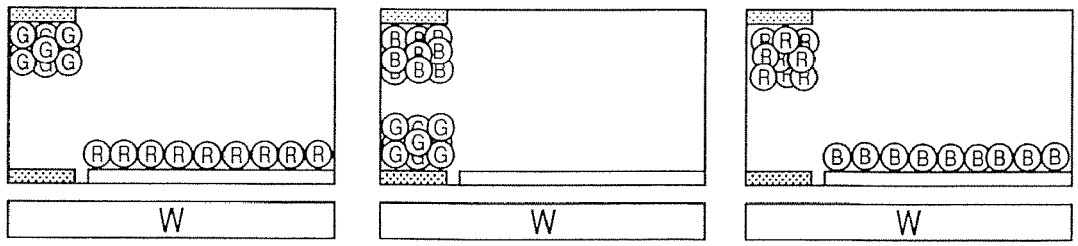

As an example of complementary-color display such as cyan display, magenta display or yellow display, a case of magenta display is shown in FIG. 12C. In the first cell, green particles are collected at the first collection electrode, and meanwhile a red particle layer is formed on the display electrode. In the second cell, blue particles and green particles are collected at the first collection electrode and second collection electrode, respectively, to make the white scattering layer uncovered. In the third cell, red particles are collected at the first collection electrode, and meanwhile a blue particle layer is formed on the display electrode. White incident light is modulated to magenta light by the additive color mixing between the red light component scattered in the first cell, the white light component scattered in the second cell and the blue light component scattered in the third cell, and is emitted.

Figure 12D:
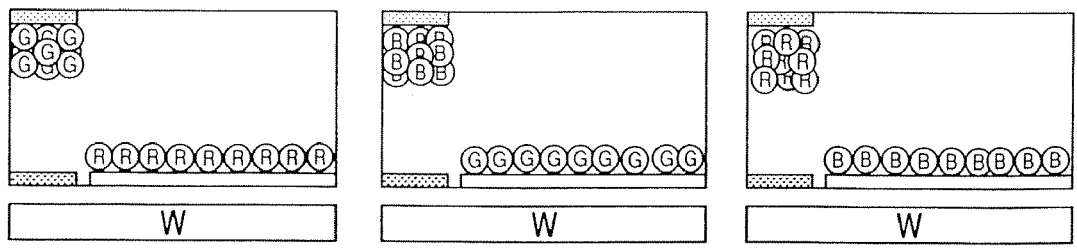

In the case of black display, as shown in FIG. 12D, in the first cell, green particles are collected at the first collection electrode, and on the other hand, a red particle layer is formed on the display electrode. In the second cell, blue particles are collected at the first collection electrode, and meanwhile a green particle layer is formed on the display electrode. In the third cell, red particles are collected at the first collection electrode and meanwhile a blue particle layer is formed on the display electrode. White incident light is modulated to white light attenuated to ⅓ in intensity, by the additive color mixing between the red light component scattered in the first cell, the green light component scattered in the second cell and the blue light component scattered in the third cell, and is emitted.

Figure 13:
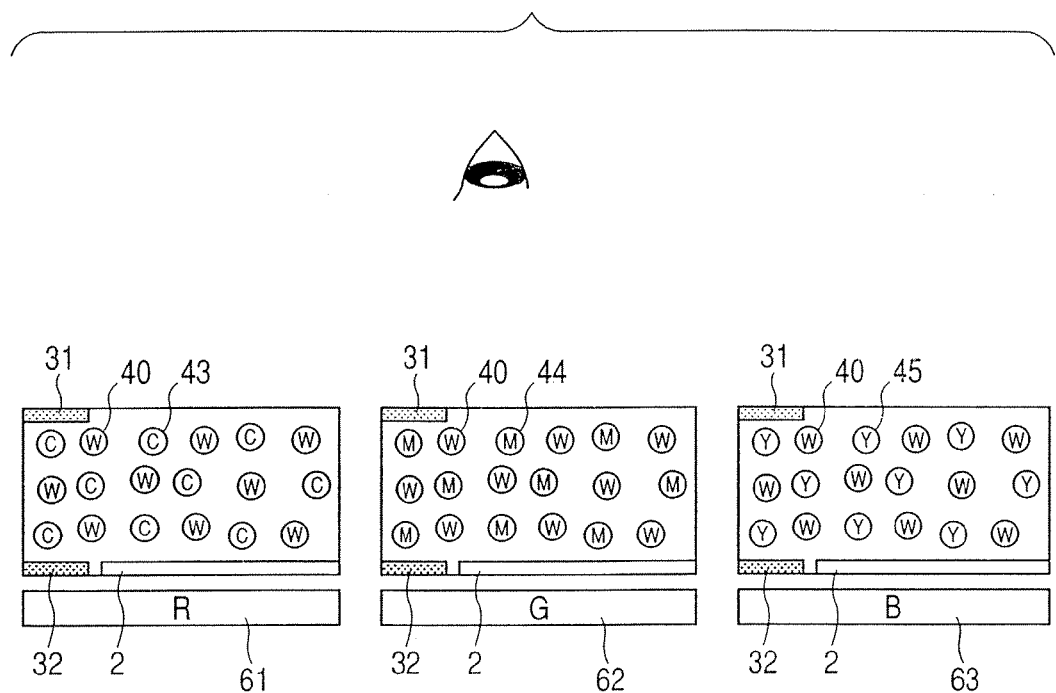
FIG. 13 is a sectional view of the pixel structure of a parallel-disposition type in its third example.

Next, still another typical pixel structure in the present invention and its color display method are described with reference to FIG. 13 and FIGS. 14A to 14D. FIG. 13 shows a schematic cross-section of the pixel structure. Description concerning the same constituents as shown in FIG. 9 is omitted. In this embodiment, white charged particles, color charged particles, and a color reflection layer different in color from the color charged particles are introduced into each cell. As the combination of the colors of color charged particles and the color reflection layer, it may include combinations of red and cyan, green and magenta, and blue and yellow; combinations of red and green, green and blue, and blue and red; and combinations of cyan and magenta, magenta and yellow, and yellow and cyan. The color particles may be light-transmissive. In the case where the color particles are light-transmissive, upon forming color particle layers in the display areas, white incident light is modulated by the additive color mixing between the color particle layers and the color reflection layers.

In FIG. 13, the first cell, second cell and third cell are filled with insulating liquids in which light-transmissive cyan particles 43 and white particles 40, light-transmissive magenta particles 44 and white particles 40, and light-transmissive yellow particles 45 and white particles 40, respectively, stand dispersed. A red reflection layer 61, a green reflection layer 62 and a blue reflection layer 63 are also disposed on the backs of the first cell, second cell and third cell, respectively. In this embodiment, there is such an advantage that the light-screening performance of black display and the brightness and sharpness of color display are improved.

A color display method in the pixel structure shown in FIG. 13 is described below with reference to FIGS. 14A to 14D, regarding respective cases of white display, monochrome display, complementary-color display and black display.

Figure 14A:
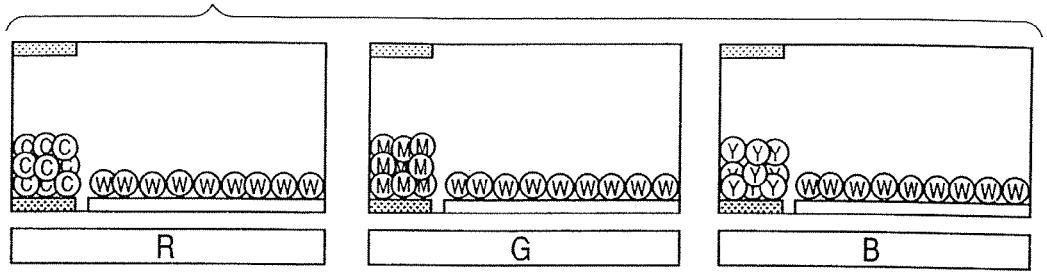
FIGS. 14A, 14B, 14C and 14D illustrate a color display method in the third example of the pixel structure of a parallel-disposition type.

In the case of white display, as shown in FIG. 14A, in all cells, white particles are arranged on the display electrodes, and color particles are collected at the second collection electrodes. White incident light is scattered at white particle layers, and white light is emitted without being modulated.

Figure 14B:
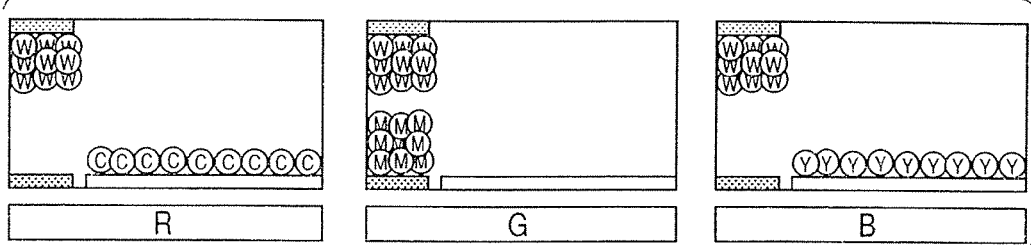

As an example of monochrome display such as red display, green display or blue display, a case of green display is shown in FIG. 14B. In the first cell, white particles are collected at the first collection electrode, and on the other hand, a cyan particle layer is formed on the display electrode. In the second cell, white particles and magenta particles are collected at the first collection electrode and second collection electrode, respectively, to make the green reflection layer uncovered. Also, in the third cell, white particles are collected at the first collection electrode, and on the other hand, a yellow particle layer is formed on the display electrode. White incident light is modulated to green light as a result that it is all absorbed by the subtractive color mixing between the color particle layers and the color reflection layers and the green light component is reflected in the second cell, and is emitted.

Figure 14C:
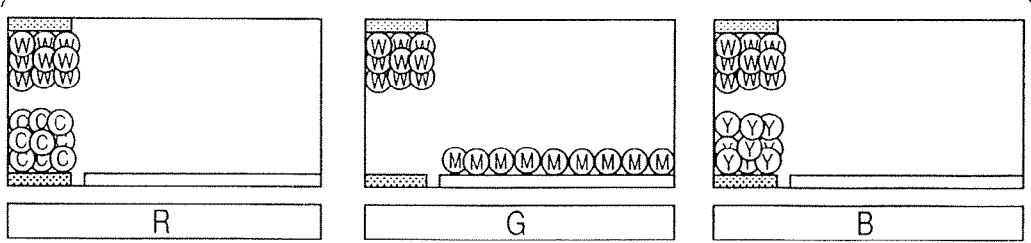

As an example of complementary-color display such as cyan display, magenta display or yellow display, a case of magenta display is shown in FIG. 14C. In the first cell, white particles and cyan particles are collected at the first collection electrode and second collection electrode, respectively, to make the red reflection layer uncovered. In the second cell, white particles are collected at the first collection electrode, and meanwhile a magenta particle layer is formed on the display electrode. In the third cell, white particles and yellow particles are collected at the first collection electrode and second collection electrode, respectively, to make the blue reflection layer uncovered. White incident light is all absorbed by the subtractive color mixing between the magenta particle layer and the green reflection layer in the second cell, and modulated to magenta light by the additive color mixing between the red light component scattered in the first cell and the blue light component scattered in the third cell and is emitted.

Figure 14D:
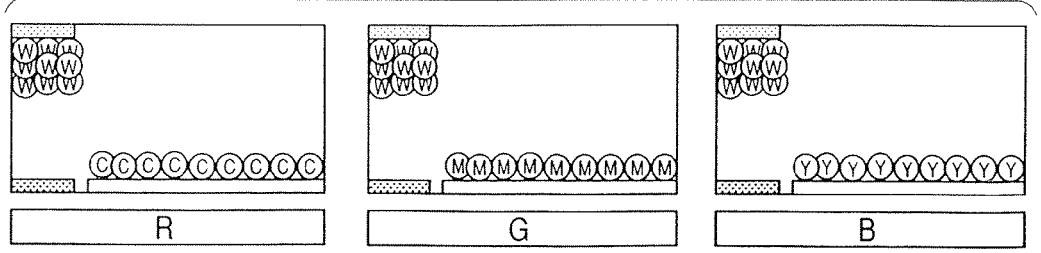

In the case of black display, as shown in FIG. 14D, in the respective cells, white particles are collected at the first collection electrodes, and meanwhile color particle layers are formed on the display electrodes. White incident light is all absorbed by the subtractive color mixing between color particle layers and color reflection layers which stand in a complementary-color relation to each other.

(Constituent Members and Their Formation Methods)

For the substrates, usable are plastic films formed of polyethylene terephthalate (PET), polycarbonate (PC) or polyether sulfone (PES), as well as quartz and glass. For the observation side substrate, a transparent material must be used. For the back substrate, however, a colored material such as polyimide (PI) may be used.

As electrode materials, any materials may be used as long as they are conductive materials capable of patterning. As display electrode materials, usable are transparent electrode materials including inorganic materials such as indium-tin oxide (ITO), organic materials such as PEDOT (trade name; available from AGFA Co.). As collection electrode materials and back substrate side display electrode materials, usable are, e.g., metals such as chromium (Cr), titanium (Ti), aluminum (Al) and copper (Cu), carbon, and silver paste, as well as organic conductive films. Where the display electrode on the back substrate side is used also as a light reflection layer, a material with a high reflectance such as silver (Ag) or aluminum (Al) may preferably be used. Where this display electrode is used as a white display electrode, the electrode surface itself is made to have surface unevenness so that the light may reflect irregularly, or a light-scattering layer is beforehand formed on the electrode.

As materials for the insulating layer, usable are materials which are thin-film and can not easily form pinholes and have a low dielectric constant, as exemplified by amorphous fluorine resins, highly transparent polyimide resins, PET, acrylic resins and epoxy resins. The insulating layer may preferably have a layer thickness of approximately from 10 nm to 1 μm.

As materials for the partition walls, polymer resins may be used. The partition walls may be formed by any methods, for example, a method in which a photosensitive resin layer formed of acrylic resin or the like is formed on the substrate by coating, followed by exposure and wet-process development; a method in which partition walls separately formed are bonded to the substrate; a method in which partition walls are formed by printing; and a method in which partition walls are previously formed on the surface of a light-transmissive first substrate by molding. Where the partition walls themselves are made up of a conductive material to serve as collection electrodes, electrolytic plating, resin molding or the like may be used. As methods of forming insulating layers on such conductive partition wall surfaces, the following may be used: for example, a method in which the electrode surfaces are oxidized by anodization, and a method in which the electrode surfaces are coated with a resin by electrodeposition resist coating.

As the insulating liquid (migration liquid for electrophoresis), usable are aromatic hydrocarbons such as benzene, toluene, xylene, and naphthene type hydrocarbons; aliphatic hydrocarbons such as hexane, cyclohexane, kerosene, paraffin type hydrocarbons and isoparaffin type hydrocarbons; and halogenated hydrocarbons such as chloroform, trichloroethylene, dichloromethane, trichlorotrifluoroethylene and bromoethyl; as well as silicone oil and high-purity petroleum. An insulating liquid having a different specific gravity may also be added in order to adapt specific gravity to that of charged particles.

For the charged particles used in the present invention, any of inorganic materials, polymeric materials and composite particles of these may be used without any particular limitations as long as the scope of the present invention is satisfied. In the case when polymeric materials are used, the following may be used, but not limited to, for example, polyacrylic resins such as polyacrylate resins, polymethacrylate resins, ethylene-acrylic acid copolymer resins, phenol novolak type epoxy resins, cresol novolak type epoxy resins, cycloaliphatic epoxy resins, glycidyl ester epoxy resins, and glycidyl phthalate epoxy resins. The charged particles may preferably have a size of from 0.05 µm to 10 µm in particle diameter. The charge polarity of the charged particles is controlled by particle constituent materials and/or charge control agent modified on particle surfaces.

The colored charged particles may preferably be colored with a dye. Where white charged particles are used, titanium oxide may be used, and, where black charged particles are used, pigments such as carbon black, Nigrosine and black iron oxide may be used. Light-transmissive colored charged particles may preferably be those having been colored with a dye. As the dye, there may be preferably used oil-soluble dyes such as azo dyes, anthraquinone dyes, quinoline dyes, nitro dyes, nitroso dyes, perinone dyes, phthalocyanine dyes, metal complex salt dyes, naphthol dyes, benzoquinone dyes, cyanine dyes, indigo dyes and quinoneimine dyes. Any of these may also be used in combination.

The dye may specifically include, e.g., Varifast Yellow 1101, 1105, 3108, 4120; Oil Yellow 105, 107, 129, 3G, GGS; Varifast Red 1306, 1355, 2303, 3304, 3306, 3320; Oil Pink 312; Oil Scarlet 308; Oil Violet 730; Varifast Blue 1501, 1603, 1605, 1607, 2606, 2610, 3405; Oil Blue 2N, BOS, 613; Macrolex Blue RR; Sumiplast Green G; and Oil Green 520, BG.

As the charge control agent added to the insulating liquid, usable are anionic surface-active agents, cationic surface-active agents, amphoteric surface-active agents, metallic soaps, nonionic surface-active agents, fluorine type surface-active agents, block type copolymers, and graft type copolymers, any of which may be used alone or in the form of a mixture of two or more, including sulfonated oils, alkyl phosphoric esters, and succinimides. These may each be added alone, or may be added in a combination of two or more. Specific examples may include cobalt naphthenate, zirconium naphthenate, zirconium octenoate, calcium petronate, lecithin, and OLOA 1200 (available from Chevron Corp.).

EXAMPLE

The cell structure, cell fabrication process and driving method are described below in greater detail by giving Example.

Figure 15A:
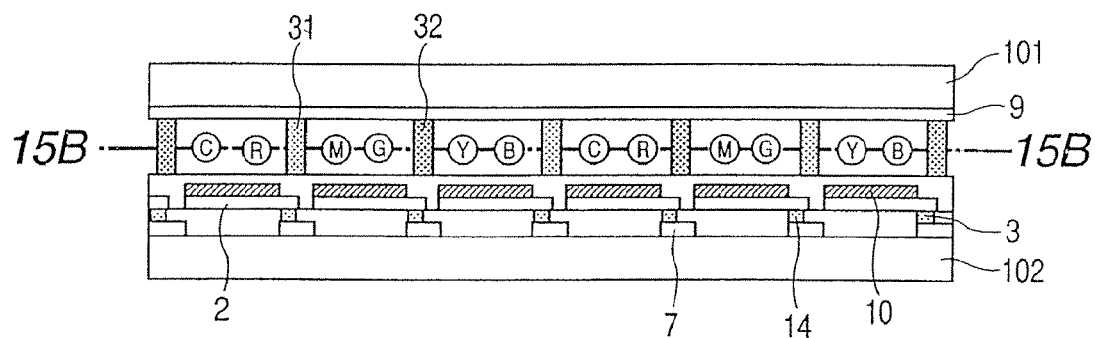
FIGS. 15A and 15B are structural views in Example.
Figure 15B:
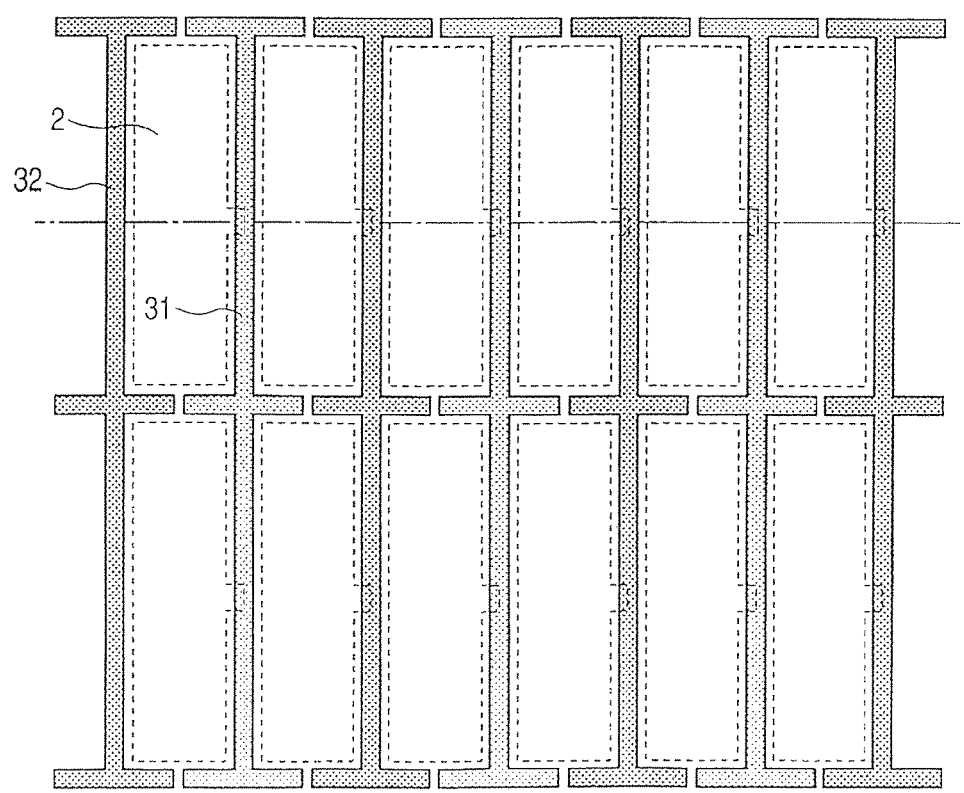

In this Example, there is described a color electrophoretic display device in which pixels so structured that three unit cells are disposed in parallel to constitute each pixel are arranged in a matrix form. The display device to be fabricated have 100×100 pixels, and each pixel has a size of 300 µm×300 µm. FIGS. 15A and 15B present a cross-sectional view (FIG. 15A) of areas corresponding to 2×2 pixels which are part of the display device, and a plan view (FIG. 15B) along the line 15B-15B in FIG. 15A.

The pixel structure in this Example is characterized in that partition walls themselves serve as collection electrodes, and is grouped into the structure described with reference to FIGS. 5A and 5B. Each pixel is constituted of three unit cells of 100 µm in width and 300 µm in length which are disposed in parallel. The charged particles are light-transmissive polymer particles colored with desired dyes. A first cell (left side), a second cell (middle) and a third cell (right side) are filled with insulating liquids in which cyan positively charged particles and red negatively charged particles, magenta positively charged particles and green negatively charged particles, and yellow positively charged particles and blue negatively charged particles, respectively, stand dispersed. The particles all have an average particle diameter of 1 to 2 µm.

The substrates consist of a first substrate 101 serving as the observation side substrate and a second substrate 102 serving as the back substrate. The pixels are each square in planar shape. At the middle area of each unit cell, a display electrode 2 is disposed on the back substrate (FIG. 15A). The respective unit cells are divided by conductive partition walls 31 and 32 which function as collection electrodes. Conductive partition walls facing each other along the unit cell lengthwise direction and with the display-electrodes positioned therebetween function as first collection electrodes 31 and second collection electrodes 32.

In FIG. 15A, reference numeral 9 denotes an insulating layer; and 10 denotes a scattering layer.

The respective collection electrodes need not be insulated for each pixel. In this Example, the collection electrode partition walls form lines connected between unit cells in the unit cell lengthwise direction, and lines of collection electrodes insulated from one another are alternately arranged in the unit cell width direction. Meanwhile, the respective display electrodes are insulated from one another, and their potentials are independently controlled by a switching element connected for each display electrode. In this Example, switching elements 72 connected to the display electrodes 2 through contact holes 14 are disposed at the pixel boundary regions on the surface of the back substrate 102 (FIG. 15A). The respective switching elements are FET type thin-film transistors (TFTs), and control the potentials of display electrodes connected to drain electrodes by applying a desired voltage to signal lines connected to source electrodes and to scanning lines connected to gate electrodes.

A fabrication process for the electrophoretic display device according to this Example is described below with reference to FIGS. 16A to 16C.

Figure 16A:
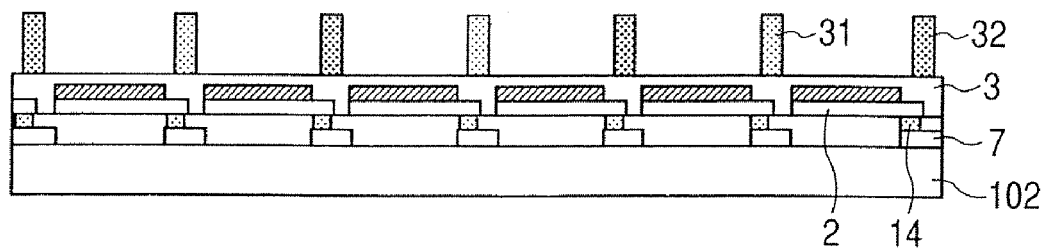
FIGS. 16A, 16B and 16C illustrate a cell fabrication process in Example.
Figure 16B:
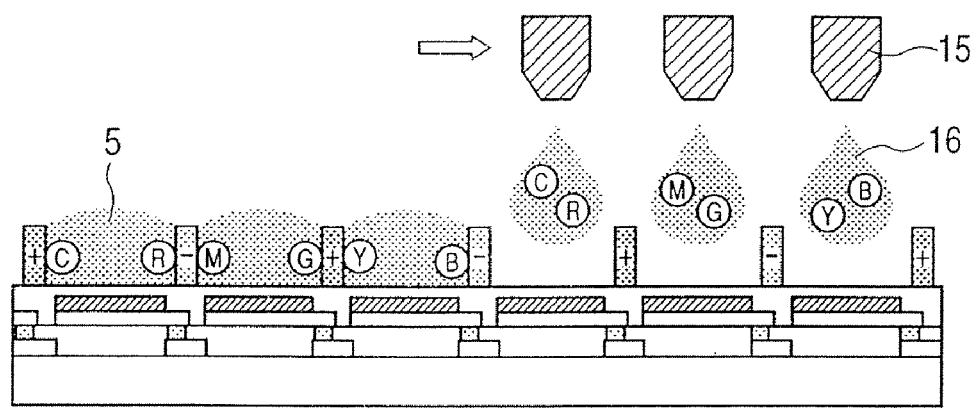
Figure 16C:
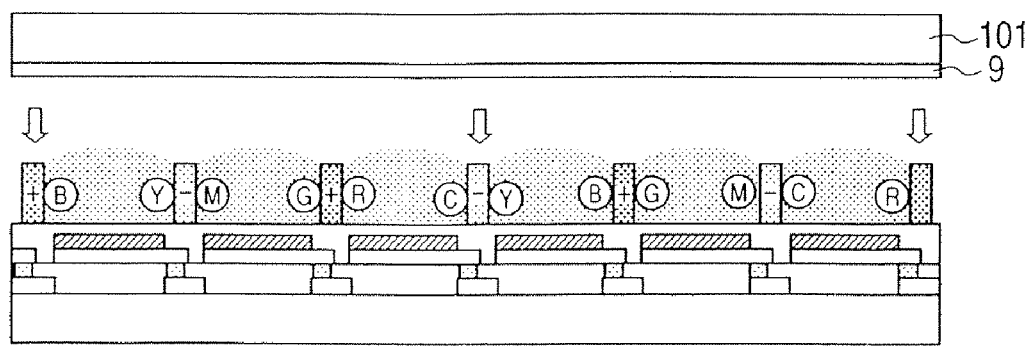
Figure 17:
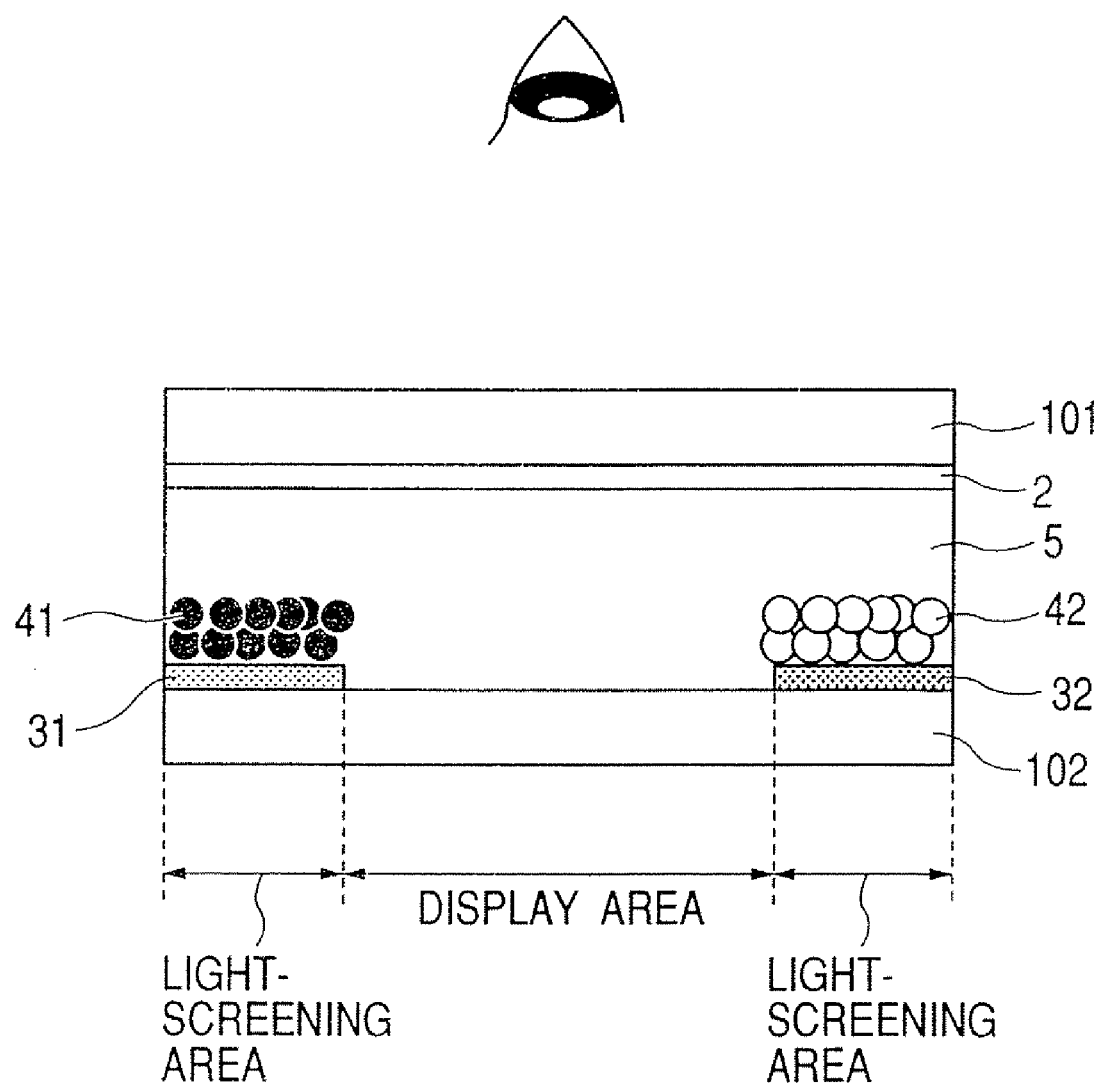
FIG. 17 is a sectional structural view of a unit cell of the prior art (dual particle curtain mode).
Figure 18A:
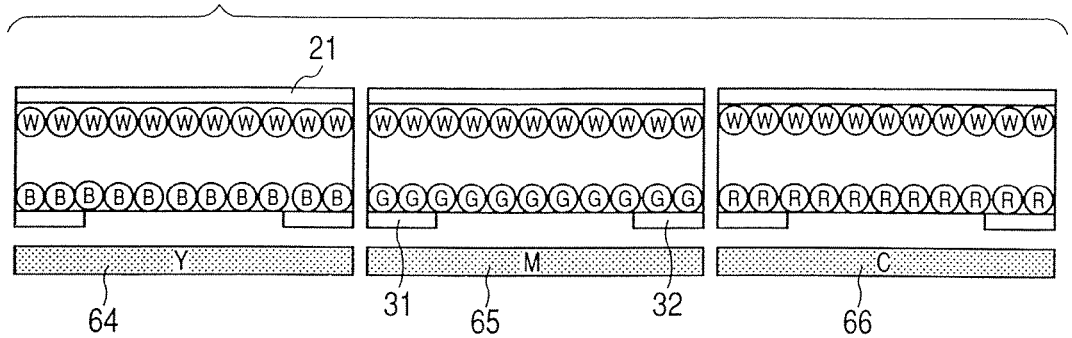
FIGS. 18A, 18B, 18C and 18D illustrate a color display method in the prior art (dual particle curtain mode).
Figure 18B:
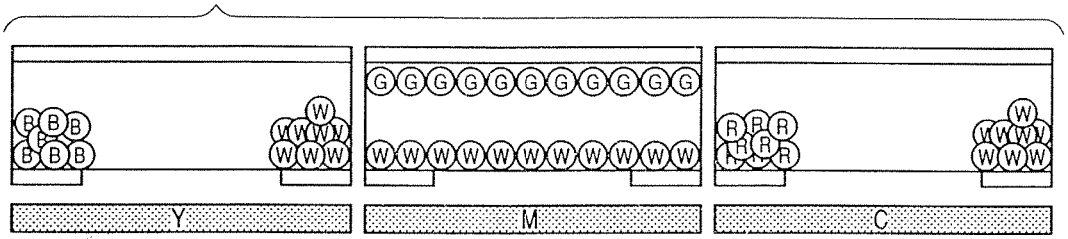
Figure 18C:
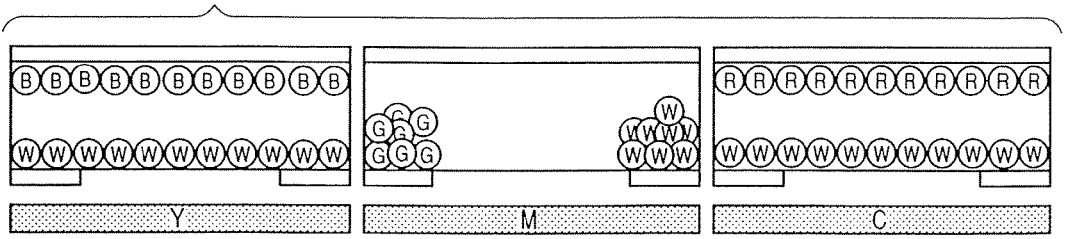
Figure 18D:
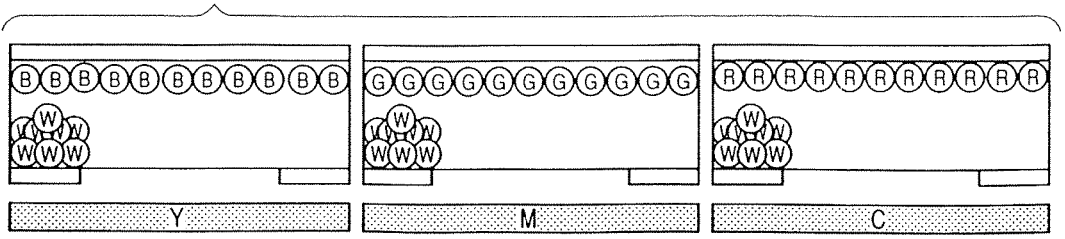

First, using a glass substrate of 1.1 mm in thickness, a back substrate 102 is fabricated (FIG. 16A). First, scanning electrode lines and gate electrodes are formed using Cr, then an SiN film is formed on the whole surface, thereafter a-Si layer/n$^+$layer are formed to provide switching element areas, and then source electrodes, drain electrodes, signal electrode lines and first common electrode lines (all not shown) are successively formed using Al, followed by patterning to form the switching elements 7, which are bottom gate type FETs. Then, these are covered with an insulating layer (not shown), and thereafter contact holes 14 are made in the insulating layer. On this insulating layer, the display electrodes 2 and second common electrode lines (not shown) are formed in thin films of ITO. The display electrodes 2 are connected to the drain electrodes of the switching elements 7 through the contact holes 14. Subsequently, these are covered with a resin insulating layer 3, and then further contact holes (not shown) are formed at cross points of first common electrode lines and pixel boundaries and at cross points of second common electrode lines and pixel boundaries. Next, on this insulating layer 3, an electrode film for plating (not shown) is formed, and a thick-film resist pattern (not shown) is formed thereon.

Then, electrolytic plating is effected on the areas where the electrode film for plating stand uncovered, to form first collection electrodes 31 and second collection electrodes 32 which both serve also as partition walls. In the course of this step, the respective collection electrodes are connected to the first common electrode lines or the second common electrode lines through their contact holes. Next, the thick-film resist pattern is removed by dissolving it, and subsequently the electrodes formed by plating thus uncovered and the surfaces of the respective collection electrodes are anodized in an aqueous oxalic acid solution to make insulative and transparent the electrodes formed by plating and also form insulating layers (not shown) on the surfaces of the respective collection electrodes.

Next, the cells formed on the back substrate 102 are filled with insulating liquids 5 in which charged particles have been dispersed. For the insulating liquids, isoparaffin (trade name: ISOPER; available from Exxson Chemical Co.) is used. In this Example, liquids in which different types of particles have been dispersed must be put in the unit cells adjoining to one another. Accordingly, three types of droplets 16 of the liquids each containing particles for one unit cell are successively injected through nozzles 16 by means of an ink jet device having a multi-nozzle (three nozzles). When injected, a voltage is applied across the first collection electrodes 31 and the second collection electrodes 32 so that the particles injected are collected at the collection electrodes immediately after they have been shot in, to prevent the particles from being transported to pixels to pixels (FIG. 16B).

Subsequently, in the state that the voltage is applied across the collection electrodes, the observation side substrate 101 is disposed on the top faces of the partition walls formed on the back substrate 102. (In the observation side substrate 101, used is a glass substrate of 0.5 mm in thickness which has been covered on its surface with an insulating layer 9.) In this state, the observation side substrate 101 is, with heating, uniformly pressed against the top faces of the partition walls to join them with an adhesive. Thereafter, the peripheries of the observation side substrate 101 and back substrate 102 are sealed. Thus the electrophoretic display device is completed (FIG. 16C).

The electrophoretic display device thus fabricated was connected to a driving device (not shown) to inspect display operation in the following way.

First, as whole-area initial reset operation, selection signals are applied to all the scanning lines to set the gates of all the pixels ON, in the state of which 0 V is applied to all the signal lines, and at the same time 300 ms rectangular pulses of −20 V and +20V are applied to the first collection electrodes and the third collection electrodes, respectively, to make the cyan particles, the magenta particles and the yellow particles collect to the first collection electrodes, and the red particles, the green particles and the blue particles to the second collection electrodes. After the pulses have been applied, non-selection signals are applied to all the scanning lines to set the gates of all the pixels OFF to complete the initialization reset operation. In the state of initial reset, the whole area stands white.

Writing operation is made by applying selection signals to the scanning lines in order in the same manner as in usual active matrix drive, and applying to the selected signal lines the writing signals corresponding to the scanning lines selected in synchronization with selection periods. Writing signals for writing desired colors are applied in respect of all the cases of white display, monochrome display, complementary-color display and black display.

In the case of white display, 0 V is applied as writing signals to the display electrodes to retain the reset state.

In the case of green display, writing signals of +20 V are applied to the first cells to make the cyan particles move to the display electrodes, writing signals of −20 V are applied to the second cells to make the green particles move to the display electrodes, and writing signals of +20 V are applied to the third cells to make the green particles move to the display electrodes.

In the case of magenta display, writing signals of −20 V are applied to the first cells to make the red particles move to the display electrodes, writing signals of +20 V are applied to the second cells to make the magenta particles move to the display electrodes, and writing signals of −20 V are applied to the third cells to make the blue particles move to the display electrodes.

In the case of black display, writing signals of −20 V are applied to the first cells to make the red particles move to the display electrodes, writing signals of −20 V are applied to the second cells to make the green particles move to the display electrodes, and writing signals of −20 V are applied to the third cells to make the blue particles move to the display electrodes.

Color display images obtained by the above method were bright and sharp, bringing the effect as expected.

The invention claimed is:

1. An electrophoretic display device comprising a substrate and unit cells provided thereon, each of which comprising:
    two types of charged particles which are different from each other in charge polarity and coloration;
    one display electrode forming a display area,
    two collection electrodes for collecting said two types of charged particles; and
    a driving means capable of forming a state in which each of the two types of charged particles have been collected at each of the collection electrodes,
    a state in which one of the two types of charged particles have been disposed on the display electrode and the other type of charged particles have been collected at one of the collection electrodes, a state in which said one of the two types of charged particles have been collected at one of the collection electrodes and said other type of charged particles have been disposed on the display electrode, and a state intermediate between these states,
    wherein said unit cells are arranged in matrix form, and each of the two collection electrodes in each unit cell is a common electrode to which a voltage common to all unit cells is to be applied, and wherein the display electrode in each unit cell is an electrode which is driven individually.

2. The electrophoretic display device according to claim 1, wherein said two collection electrodes are disposed at a position where they lie substantially one upon another as viewed from the observer side.

3. The electrophoretic display device according to claim 2, wherein said unit cell has a partition wall which divides adjoining unit cells, and said two collection electrodes are disposed on both ends of the partition wall or in the interior of the partition wall.

* * * * *